2,998,347
CARBAMATE PHOSPHATES AS COMPOSITIONS OF MATTER AND AS INSECTICIDES AND ACARICIDES

Llewellyn W. Fancher and Donald G. Stoffey, Richmond, Richard C. Maxwell, Santa Clara, and Julius J. Menn, San Jose, Calif., assignors to Stauffer Chemical Company, a corporation of Delaware
No Drawing. Filed July 24, 1959, Ser. No. 829,195
12 Claims. (Cl. 167—22)

This invention relates to certain novel carbamate phosphates as new compounds and the use of the compounds as insecticides and acaricides.

More specifically, the invention relates to carbamate phosphates of the general formula:

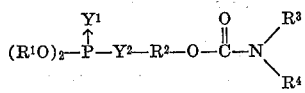

In the above formula, $Y^1$ and $Y^2$ are sulfur or oxygen and at least one of $Y^1$ and $Y^2$ is sulfur, $R^1$ is lower alkyl radical, $R^2$ is the radical —$CH_2CH_2$— and $R^3$ and $R^4$ are hydrogen, lower alkyl radicals, substituted or unsubstituted phenyl radicals or together form part of a heterocyclic ring. Those compounds are preferred wherein $Y^2$ is sulfur.

The compounds of the present invention can be made in accordance with the following methods (code numbers have been assigned to each of the compounds and are used in the balance of the specification):

Example 1.—R–2967. *beta-(O,O-dimethyldithiophosphoryl)-ethylcarbamate*.—Into a 500 ml. round-bottomed flask equipped with a stirrer, thermometer and condenser with a water trap were placed 12 g. of sodium-O,O-dimethyldithiophosphate and 150 ml. of toluene. The salt and toluene were dried by refluxing until no more water collected in the trap. To the refluxing solvent, 6.2 g. of beta-chloroethylcarbamate was added, and refluxing was continued for four hours. The reaction mixture was cooled, and the salts were dissolved in 50 ml. of water with stirring. The material was transferred to a separatory funnel, and the aqueous layer was removed and discarded. The toluene layer was washed with water twice more and then dried over magnesium sulfate, filtered and the solvent was removed in a rotary evaporator to give 8 g. (65% yield) of the light amber beta-(O,O-dimethyldithiophosphoryl)-ethylcarbamate, $n_D^{30}$ 1.5033. Anal. for phosphorus: Calc., 12.63%. Found, 13.8%.

Example 2.—R–3218. *beta-(O,O-dimethyldithiophosphoryl)-ethyl-N-butyl-N-methylcarbamate*.—In essentially the same manner as in Example 1, beta-(O,O-dimethyldithiophosphoryl)-ethyl-N-butyl-N-methylcarbamate was prepared using 9.7 g. of beta-chloroethyl-N-butyl-N-methylcarbamate and 10 g. of sodium-O,O-dimethyldithiophosphate in 150 ml. of toluene to give 9.9 g. (63% yield) of pale amber liquid, $n_D^{30}$ 1.4825. Anal. for phosphorus: Calc., 9.82%. Found, 7.59%.

Example 3.—R–2968. *beta-(O,O-diethyldithiophosphoryl)-ethylcarbamate*.—In essentially the same manner as Example 1, beta-(O,O-diethyldithiophosphoryl)-ethylcarbamate was prepared from 82.4 g. of beta-chloroethylcarbamate and 200 g. of sodium-O,O-diethyldithiophosphate in 1500 ml. of toluene to give 159.5 g. (97% yield) of nearly colorless liquid, $n_D^{30}$ 1.5158. Anal. for phosphorus: Calc., 11.33%. Found, 11.5%.

Example 4.—R–3252. *beta-(O,O-diethyldithiophosphoryl)-ethyl-N-propylcarbamate*.—In essentially the same manner as Example 1, beta-(O,O-diethyldithiophosphoryl)-ethyl-N-propylcarbamate was prepared from 16.6 g. of beta-chloroethyl-N-propylcarbamate and 25 g. of sodium-O,O-diethyldithiophosphate in 150 ml. of toluene to give 24.5 g. (78% yield) of pale amber liquid, $n_D^{30}$ 1.4983. Anal. for phosphorus: Calc., 9.84%. Found, 9.37%.

Example 5.—R–2972. *beta-(O,O-diethylthiolphosphoryl)-ethylcarbamate*.—In essentially the same manner as Example 1, beta-(O,O-diethylthiolphosphoryl)-ethylcarbamate was prepared from 6.2 g. of beta-chloroethylcarbamate and 15 g. of sodium-O,O-dimethylthiolphosphate in 150 ml. of toluene to give 5.5 g. (43% yield) of nearly colorless liquid, $n_D^{30}$ 1.4668. Anal. for phosphorus: Calc., 12.04%. Found, 13.4%.

Example 6.—R–3262. *beta-(O,O-diethyldithiophosphoryl)-ethyl-p-chlorocarbanilate*.—Into a 500 ml. round-bottomed flask equipped with a stirrer, thermometer and condenser were placed 11.7 g. of beta-chloroethyl-p-chlorocarbanilate, 15 g. of sodium-O,O-diethyldithiophosphate, 0.2 g. of potassium iodide and 150 ml. of methylethylketone. The mixture was heated at reflux for seven hours with stirring. The solvent was removed in a rotary evaporator, and 100 ml. each of water and ether were added with shaking. The aqueous layer was discarded, and the ether layer was washed with water twice and then dried over magnesium sulfate, filtered, and the solvent was removed in a rotary evaporator to give 12.0 g. (63% yield) of the brown liquid, $n_D^{30}$ 1.5504.

Example 7.—R–3292. *beta-(O,O-diethylthiolphosphoryl)-ethylcarbanilate*.—In essentially the same manner as in Example 6, beta-(O,O-diethylthiolphosphoryl)-ethylcarbanilate was prepared from 19.9 g. of beta-chloroethylcarbanilate, 25 g. of sodium-O,O-diethylthiolphosphate, 0.2 g. of potassium iodide and 150 ml. of methylethylketone to give 18.6 g. (56% yield) of brown liquid which partially crystallized upon standing. Upon filtering, the brown filtrate had an index of refraction of $n_D^{30}$ 1.5368.

In essentially the same manner as Example 1, the following carbamate phosphates were prepared:

| Example | Code No. | Compound |
|---|---|---|
| 8 | R-3216 | beta-(O,O-Dimethyldithiophosphoryl)-ethyl-N-propylcarbamate. |
| 9 | R-3217 | beta-(O,O-Dimethyldithiophosphoryl)-ethyl-N-butylcarbamate. |
| 10 | R-3260 | beta-(O,O-Diethyldithiophosphoryl)-ethyl-N-butylcarbamate. |
| 11 | R-3271 | beta-(O,O-Diethyldithiophosphoryl)-ethyl-N-butyl-N-methylcarbamate. |
| 12 | R-3276 | beta-(O,O-Diethylthiolphosphoryl)-ethyl-N-propylcarbamate. |
| 13 | R-3278 | beta-(O,O-Diethylthiolphosphoryl)-ethyl-N-butylcarbamate. |
| 14 | R-3279 | beta-(O,O-Diethylthiolphosphoryl)-ethyl-N,N-dimethylcarbamate. |
| 15 | R-3280 | beta-(O,O-Diethylthiolphosphoryl)-ethyl-N-butyl-N-methylcarbamate. |
| 16 | R-3286 | beta-(O,O-Dimethyldithiophosphoryl)-ethyl-N,N-di-i-propylcarbamate. |
| 17 | R-3290 | beta-(O,O-Diethyldithiophosphoryl)-ethyl-N,N-di-i-propylcarbamate. |
| 18 | R-3293 | beta-(O,O-Diethylthiolphosphoryl)-ethyl-N,N-di-i-propylcarbamate. |
| 19 | R-3294 | beta-(O,O-Dimethyldithiophosphoryl)-ethyl-N-pentylcarbamate. |
| 20 | R-3299 | beta-(O,O-Diethyldithiophosphoryl)-ethyl-N-pentylcarbamate. |
| 21 | R-3300 | beta-(O,O-Diethylthiolphosphoryl)-ethyl-N-pentylcarbamate. |

In essentially the same manner as Example 6, except no potassium iodide was used, the following carbamate phosphates were prepared:

| Example | Code No. | Compound |
|---|---|---|
| 22 | R-2964 | beta-(O,O-Dimethyldithiophosphoryl)-ethyl-N-methylcarbamate. |
| 23 | R-2960 | beta-(O,O-Dimethyldithiophosphoryl)-ethyl-N-ethylcarbamate. |
| 24 | R-2953 | beta-(O,O-Dimethyldithiophosphoryl)-ethyl-N-i-propylcarbamate. |
| 25 | R-3121 | beta-(O,O-Dimethyldithiophosphoryl)-ethyl-N,N-dimethylcarbamate. |
| 26 | R-3132 | beta-(O,O-Dimethyldithiophosphoryl)-ethyl-N,N-diethylcarbamate. |
| 27 | R-3114 | beta-(O,O-Dimethyldithiophosphoryl)-ethyl-carbanilate. |
| 8 | R-2965 | beta-(O,O-Diethyldithiophosphoryl)-ethyl-N-methylcarbamate. |
| 29 | R-2961 | beta-(O,O-Diethyldithiophosphoryl)-ethyl-N-ethylcarbamate. |
| 30 | R-2954 | beta-(O,O-Diethyldithiophosphoryl)-ethyl-N-i-propylcarbamate. |
| 31 | R-3120 | beta-(O,O-Diethyldithiophosphoryl)-ethyl-N,N-dimethylcarbamate. |
| 32 | R-3131 | beta-(O,O-Diethyldithiophosphoryl)-ethyl,N,N-diethylcarbamate. |
| 33 | R-3115 | beta-(O,O-Diethyldithiophosphoryl)-ethyl-carbanilate. |
| 34 | R-2970 | beta-(O,O-Diethylthiolphosphoryl)-ethyl-N-methylcarbamate. |
| 35 | R-2966 | beta-(O,O-Diethylthiolphosphoryl)-ethyl-N-ethylcarbamate. |
| 36 | R-2957 | beta-(O,O-Diethylthiolphosphoryl)-ethyl-N-i-propylcarbamate. |
| 37 | R-3134 | beta-(O,O-Diethylthiolphosphoryl)-ethyl-N,N-diethylcarbamate. |

In a similar manner, the following compounds were made:

| Example | Code No. | Compound |
|---|---|---|
| 38 | R-3232 | beta-(O,O-Diethylthionophosphoryl)-ethyl-carbamate. |
| 39 | R-3233 | beta-(O,O-Diethylthionophosphoryl)-ethyl-N-methylcarbamate. |
| 40 | R-3235 | beta-(O,O-Diethylthionophosphoryl)-ethyl-N-ethylcarbamate. |
| 41 | R-3243 | beta-(O,O-Diethylthionophosphoryl)-ethyl-N-propylcarbamate. |
| 42 | R-3244 | beta-(O,O-Diethylthionophosphoryl)-ethyl-N,N-dimethylcarbamate. |
| 43 | R-3247 | beta-(O,O-Diethylthionophosphoryl)-ethyl-N,N-diethylcarbamate. |
| 44 | R-3248 | beta-(O,O-Diethylthionophosphoryl)-ethyl-N,N-dipropylcarbamate. |
| 45 | R-3264 | beta-(O,O-Diethylthionophosphoryl)-ethyl-N-n-butylcarbamate. |
| 46 | R-3265 | beta-(O,O-Diethylthionophosphoryl)-ethyl-N-allyl-carbamate. |
| 47 | R-3267 | beta-(O,O-Diethylthionophosphoryl)-ethyl-N-n-amylcarbamate. |
| 48 | R-3268 | beta-(O,O-Diethylthionophosphoryl)-ethyl-N-benzylcarbamate. |
| 49 | R-3275 | beta-(O,O-Diethylthionophosphoryl)-ethyl-4-morpholinocarboxylate. |

The compounds have been tested as insecticides and as acaricides according to the following methods:

Acaricidal Evaluation Test: The two-spotted mite, *Tetranychus telarius* (Linn.) is employed in tests for acaricides. Young Pinto bean plants are infested with several hundred mites. Dispersions of test compounds are prepared by dissolving half a gram of the toxic material in ten milliliters acetone. This solution is then diluted with water containing 0.015% Vatsol (a sulfonate type wetting agent) and 0.005% Methocel (methyl cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the column "2 SM" in Table 1 and "PE" indicates the post-embryonic forms.

Systemic Toxicity Evaluation Against Two-spotted Mites: Pinto bean plants in the primary leaf stage are placed in 250 ml. capacity Erlenmeyer flasks, one plant per flask. A portion of the test compound is dissolved in 10 ml. acetone. This solution is then diluted with distilled water, the amount of water being sufficient to give concentrations of active ingredient ranging from one hundred parts per million (p.p.m.) to one part per million. The final volume of test dispersion per flask is 200 ml. The treated plants are infested with several hundred two-spotted mites, *Tetranychus telarius* (Linn.). The results are reported in the table under "2 SM Systemic."

After seven and fourteen days, the plants are examined both for post-embryonic forms of the mite as well as eggs. The percentage of kill is determined by comparison with control plants which have been placed in distilled water only. Again, the LD–50 value is calculated and reported under the column "2 SM Systemic" in Table 1.

Insecticidal Evaluation Tests: Five insect species are subjected to evaluation tests for insecticides:

(1) American cockroach (Roach)—*Periplaneta americana* (Linn.)
(2) Large milkweed bug (MWB)—*Oncopeltus fasciatus* (Dallas)
(3) Pea aphid (PA)—*Macrosiphum pisi* (Harris)
(4) Confused flour beetle (CFB)—*Tribolium confusum* (Duval)
(5) House fly (HF)—*Musca domestica* (Linn.)

The procedure for insects 1, 2, 4 and 5 is similar to the miticidal testing procedure. Test insects are caged in cardboard mailing tubes 3⅛″ in diameter and 2⅝″ tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and seventy-two hours, counts are made to determine living and dead insects. The LD–50 values are calculated using well known procedures.

The evaluation procedure on the pea aphid is as follows: Pinto bean plants are cut off above the root zone and the foliage is dipped in the dispersion of the active compound for fifteen seconds. The stems are then inserted through a small slit in a plastic cover into a bottle of water. As soon as the foliage has dried, each plant is infested with ten second or third instar aphids and caged on the plant. Mortality observations are made seventy-two hours later. Again, LD–50 values are determined and reported under the appropriate abbreviations in Table 1.

The following results were obtained:

TABLE 1
*Approximate LD-50 values of carbamate phosphates*

| Code No. | 2 SM PE, percent | 2 SM Eggs, percent | HF, mmg. | Roach, percent | MWB, percent | OFB, percent | PA, percent | 2 SM Systemic, p.p.m. |
|---|---|---|---|---|---|---|---|---|
| R-2953 | x | x | >500 | x | x | >0.5 | >0.01 | 100 |
| R-2954 | <0.06 | <0.06 | 100 | <0.5 | x | >0.5 | x | 100 |
| R-2957 | >0.06 | x | <500 | >0.5 | >0.5 | x | >0.01 | >10 |
| R-2960 | x | x | >100 | >0.5 | 0.5 | <0.5 | x | >10 |
| R-2961 | 0.06 | x | 100 | >0.1 | >0.5 | >0.5 | x | 100 |
| R-2964 | >0.06 | x | 100 | 0.1 | >0.06 | <0.5 | x | >10 |
| R-2965 | <0.06 | 0.06 | <50 | >0.1 | >0.1 | >0.5 | x | <10 |
| R-2966 | x | x | <500 | <0.5 | >0.1 | >0.1 | x | >10 |
| R-2967 | >0.06 | x | >50 | >0.1 | >0.5 | >0.03 | >0.01 | >2 |
| R-2968 | 0.01 | 0.01 | 25 | <0.06 | 0.08 | >0.1 | >0.01 | >1 |
| R-2970 | >0.06 | x | >100 | >0.1 | >0.1 | x | >0.01 | 10 |
| R-2972 | >0.06 | x | <100 | >0.1 | >0.1 | >0.5 | <0.01 | 10 |
| R-3114 | x | x | <500 | >0.5 | >0.12 | x | >0.01 | |
| R-3120 | 0.03 | 0.06 | <100 | 0.06 | 0.12 | 0.25 | | |
| R-3121 | >0.06 | 0.06 | >100 | 0.12 | >0.06 | <0.25 | | |
| R-3131 | <0.06 | 0.06 | 100 | 0.06 | 0.5 | >0.5 | >0.01 | |
| R-3132 | x | x | 1000 | >0.25 | 0.5 | >0.25 | >0.01 | |
| R-3134 | >0.06 | >0.06 | | >0.12 | 0.25 | x | 0.01 | |
| R-3216 | >0.06 | >0.06 | | >0.5 | >0.5 | >0.5 | | |
| R-3217 | >0.06 | >0.06 | | x | >0.5 | x | 0.05-0 | |
| R-3218 | 0.06 | >0.06 | | >0.5 | >0.5 | x | 0.05-15 | |
| R-3232 | <0.06 | 0.06 | | | 0.5 | 0.5 | | >10 |
| R-3233 | <0.06 | 0.06 | | | 0.5 | 0.5 | | |
| R-3235 | >0.06 | >0.06 | | | >0.5 | 0.5 | | |
| R-3243 | >0.06 | >0.06 | | | 0.5 | 0.5 | | |
| R-3244 | 0.06 | 0.06 | | | 0.5 | 0.5 | | |
| R-3247 | >0.06 | >0.06 | | | 0.5 | 0.5 | | |
| R-3248 | x | x | | | >0.5 | 0.5 | | |
| R-3252 | {>0.01 / <0.06 | >0.03 / <0.06} | | 0.5 | >0.5 | x | | |
| R-3260 | >0.01 | >0.03 | | x | >0.5 | x | 0.05-15 | |
| R-3262 | <0.06 | 0.06 | | >0.5 | >0.5 | x | 0.05-0 | |
| R-3264 | x | x | | | >0.5 | >0.5 | | |
| R-3265 | x | x | | | >0.5 | 0.5 | | |
| R-3267 | <0.06 | <0.06 | | | >0.5 | 0.5 | | |
| R-3268 | <0.06 | <0.06 | | | >0.5 | 0.5 | | |
| R-3271 | <0.06 | <0.06 | | <0.5 | >0.5 | >0.5 | 0.05-0 | |
| R-3275 | <0.06 | >0.06 | | | | | | |
| R-3276 | >0.06 | x | | >0.5 | >0.5 | x | 0.05-10 | |
| R-3278 | x | x | | x | >0.5 | >0.5 | | |
| R-3279 | >0.06 | x | | <0.5 | <0.5 | 0.5 | | |
| R-3280 | >0.06 | x | | >0.5 | 0.5 | x | | |
| R-3286 | 0.01 | 0.06 | | >0.5 | >0.5 | x | | |
| R-3290 | <0.01 | <0.06 | | <0.5 | >0.5 | x | 0.05-15 | |
| R-3292 | >0.06 | x | | x | >0.5 | >0.5 | 0.05-0 | |
| R-3293 | <0.06 | >0.06 | | x | >0.5 | x | 0.05-0 | |
| R-3294 | >0.06 | >0.06 | | | >0.5 | x | | |
| R-3299 | <0.01 | >0.03 | | x | >0.5 | x | | |
| R-3115 | x | x | | 0.5 | >0.5 | >0.5 | | | x=LD-50 considerably greater than 0.5% for insects and 0.06% for mites.

We claim:

1. As a new compound a carbamate phosphate of the formula

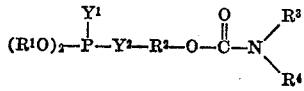

wherein $Y^1$ and $Y^2$ are selected from the group consisting of oxygen and sulfur, at least one of $Y^1$ and $Y^2$ being sulfur, $R^1$ is a lower alkyl radical, $R^2$ is the radical —$CH_2CH_2$— and $R^3$ and $R^4$ are selected from the group consisting of hydrogen, lower alkyl, lower alkenyl, lower alkyl-substituted phenyl, chloro-substituted phenyl, phenyl and a single morpholyl radical.

2. As a new compound:
beta-(O,O-dimethyldithiophosphoryl)-ethylcarbamate.

3. As a new compound:
beta-(O,O-diethyldithiophosphoryl)-ethylcarbamate.

4. As a new compound:
beta - (O,O - diethyldithiophosphoryl) - ethyl - N,N-dimethylcarbamate.

5. As a new compound:
beta - (O,O-diethyldithiophosphoryl) - ethyl - N,N - diethylcarbamate.

6. As a new compound:
beta - (O,O - diethylthionophosphoryl) - ethyl - 4 - morpholinocarboxylate.

7. The method of killing pests comprising applying to a pest habitat a compound of claim 1.

8. The method of killing pests comprising applying to a pest habitat:
beta-(O,O-dimethyldithiophosphoryl)-ethylcarbamate.

9. The method of killing pests comprising applying to a pest habitat:
beta-(O,O-diethyldithiophosphoryl)-ethylcarbamate.

10. The method of killing pests comprising applying to a pest habitat:
beta-(O,O-diethyldithiophosphoryl) - ethyl - N,N-dimethylcarbamte.

11. The method of killing pests comprising applying to a pest habitat:
beta - (O,O-diethyldithiophosphoryl) - ethyl-N,N-diethylcarbamate.

12. The method of killing pests comprising applying to a pest habitat:
beta - (O,O - diethylthionophosphoryl) - ethyl - 4 - morpholinocarboxylate.

References Cited in the file of this patent

UNITED STATES PATENTS

| 2,862,019 | Schrader | Nov. 25, 1958 |
| 2,915,429 | Scherer et al. | Dec. 1, 1959 |